UNITED STATES PATENT OFFICE.

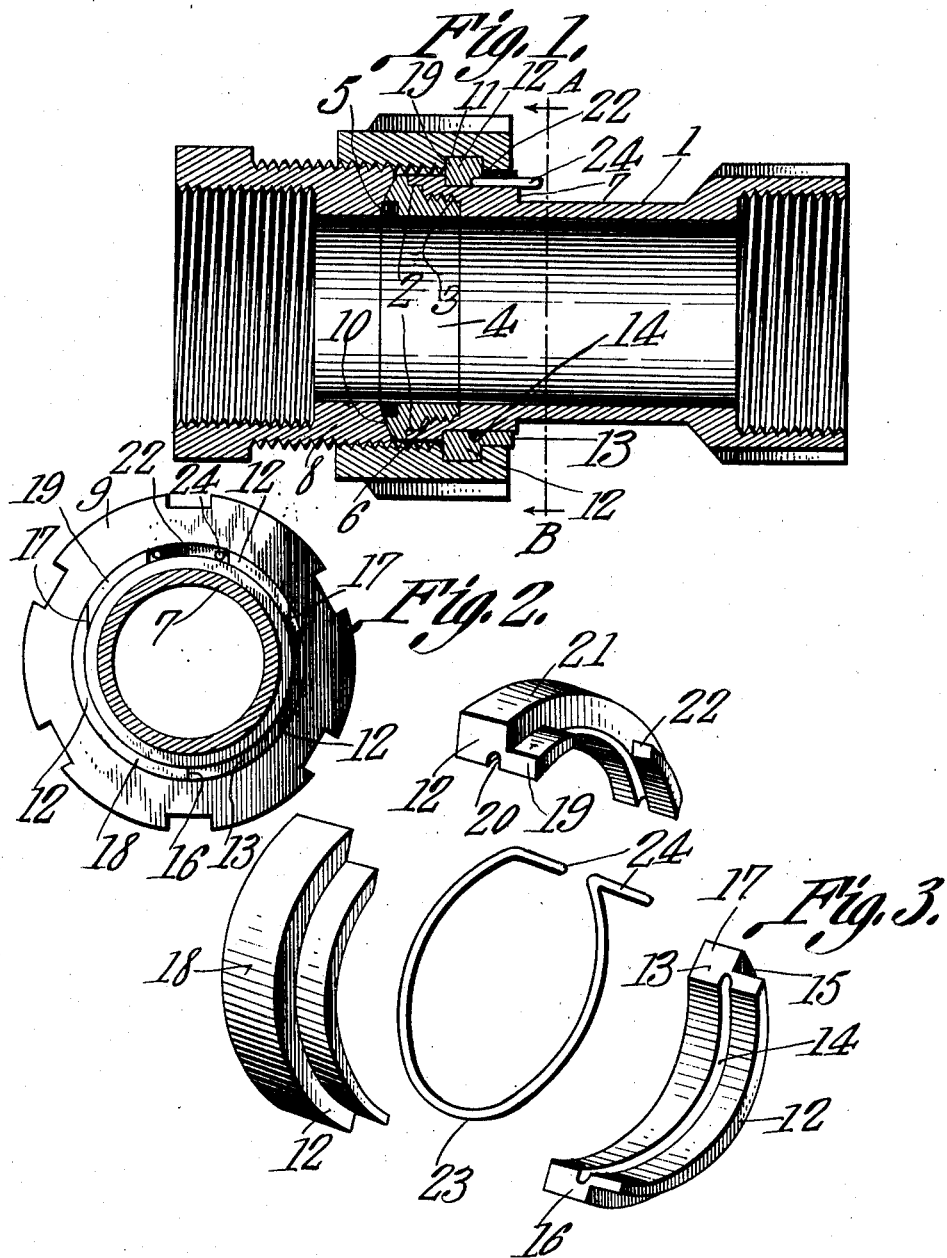

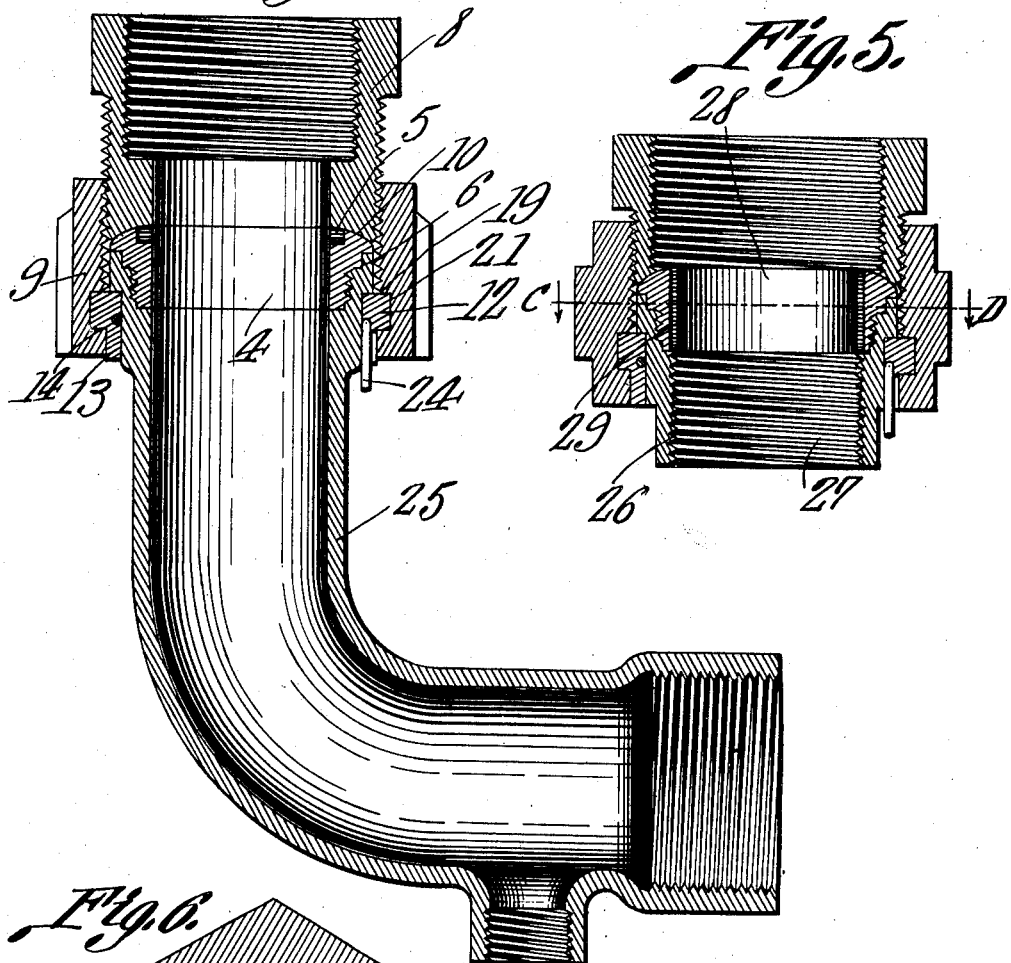
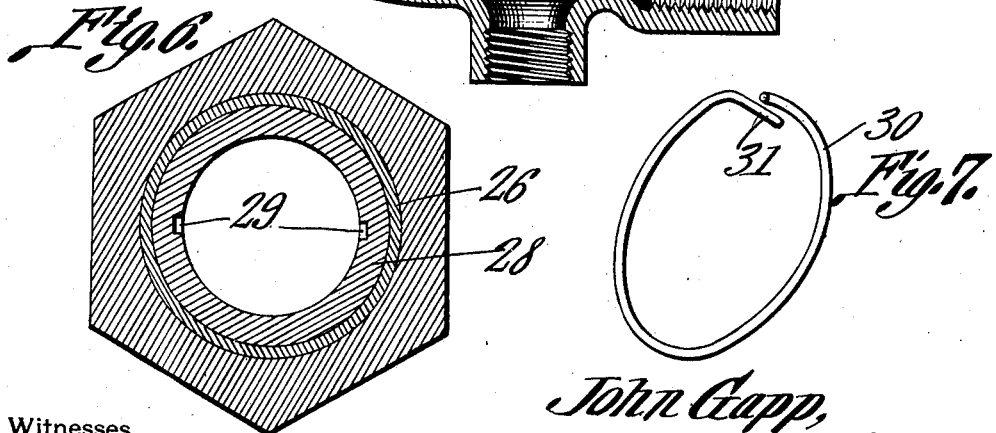

JOHN GAPP, OF SCRANTON, PENNSYLVANIA.

PIPE-COUPLING.

1,016,620.  Specification of Letters Patent.  Patented Feb. 6, 1912.

Application filed July 6, 1910. Serial No. 570,645.

*To all whom it may concern:*

Be it known that I, JOHN GAPP, a citizen of the United States, residing at Scranton, in the county of Lackawanna and State of Pennsylvania, have invented a new and useful Pipe-Coupling, of which the following is a specification.

This invention relates to pipe couplings particularly designed for making connections between injectors and boiler checks although the same can be used wherever it is desired to connect two pipes.

The invention is particularly designed for connecting iron and brass pipes, one of its objects being to provide an interchangeable brass seat for a pipe of iron or other like material, said seat being so shaped as to remain firmly in place.

A further object is to provide improved means for securing the pipes together, said means being an improvement upon that disclosed in Patent No. 769,896, issued to me on September 13, 1904.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a central longitudinal section through pipes having the present improvements applied thereto. Fig. 2 is a section on line A—B Fig. 1. Fig. 3 is a perspective view showing the sectional guide ring and its retaining spring separated. Fig. 4 is a longitudinal section through the coupling, the same being shown applied to an elbow. Fig. 5 is a central longitudinal section through a slightly modified form of coupling. Fig. 6 is a section on line D—D Fig. 5. Fig. 7 is a perspective view of the holding spring which may be used in connection with the device shown in Figs. 5 and 6.

Referring to the figures by characters of reference 1 designates a pipe, which may be of iron or any other suitable metal and which is provided, in one end, with a counter-bored recess 2, the innermost portion of which is screw-threaded, as indicated at 3. This counter-bored recess forms a triple seat for a ring 4 which may be made of brass and which is shaped to fit snugly within all portions of the recess, the outer end of said ring being flanged to lap the end of the pipe 1 and being rounded, there being recesses 5 within the rounded outer end of the ring for the reception of a tool whereby the said ring can be screwed into or out of the recess 2. An external annular flange 6 is formed upon the pipe about the recessed end thereof and an exterior annular shoulder 7 is formed upon said pipe at a point removed from the flange 6.

An exteriorly screw-threaded nipple 8 is adapted to be clamped against the rounded end of the ring 4 by means of a coupling ring 9, the end of said nipple being concaved as indicated at 10 so as to constitute a snug seat for the rounded end of the ring 4. The coupling ring 9 is interiorly screw-threaded and has an interior annular groove or channel 11 adapted to receive a guide ring 12 formed preferably of three sections. One of these sections, 13, is in the form of an arcuate strip having a longitudinal groove 14 in its inner or concave face while a longitudinally extending rectangular flange 15 is formed upon the outer or convex face of the section and along one edge thereof, said flange being proportioned to fit snugly within the channel 11 hereinbefore referred to. One end of the member 13 is cut off radially as indicated at 16 while the other end thereof is cut off in a plane parallel with the end 16 as shown at 17. The second section 18 of the guide rings 12 is an exact counterpart of the member 13 with the exception that one of these members constitutes a right hand section of the guide ring while the other member constitutes a left hand section. The third section of the guide ring is in the form of an arcuate plate 19 having a longitudinal groove 20 in its inner or concave face while a flange 21 of the same transverse contour as the flanges 15 is formed upon the outer or convex face of the section. The ends of the section 19 are parallel and are adapted, when the various sections are assembled, to complete the ring 12, to contact with and bear snugly against the ends 17 of the sections 13 and 18. Arcuate plate 19 has a recess 22 in one edge thereof and which extends back into the groove 20 within the plate.

When the sections of the guide ring are assembled within the coupling ring 9, the outstanding flanges 15 18 and 21 constitute a continuous annular flange which fits snugly within the channel 11, the projecting portions of the members of the guide ring resting within that portion of the coupling ring between the channel 11 and the end of the coupling ring. That portion of the pipe 1 located between the shoulder 7 and the flange 6 is adapted to support the sections of the guide ring within the channel 11. If desired, however, a spreading spring 23 may be utilized for retaining the sections of the guide ring in the channel 11 independently of the pipe 1. As shown in Fig. 2, this spring is in the form of a split ring the terminals of which are bent outwardly to form parallel arms. These arms have been shown at 24. Spring 23 is adapted to rest within the grooves 14 and 20 and with the arms 24 extending outwardly through the recess 22.

As long as the sectional guide ring is seated within the channel 11, the pipe 1 will be prevented from pulling out of the ring 9, it being impossible for the flange 6 to pass through the guide ring. By screwing the nipple 8 into the coupling ring and forcing it against the rounded end of the ring 4, the shoulder or flange 6 can be caused to bear firmly against the guide ring 12.

By providing the pipe 1 with a ring 4 formed of brass or other metal capable of withstanding the action of moisture, it becomes possible to form the pipe 1 of iron or other sheet metal without reducing the efficiency of the structure. By removing the nipple 8, a tool can be inserted into the recesses 5 and the ring 4 unscrewed from the pipe 1 without the necessity of disengaging the said pipe from the coupling ring 9. To remove the pipe 1 from the ring 9, said pipe is shifted longitudinally within the ring until the channeled portion of said ring is brought beyond the shoulder 7. The sections 13, 18 and 19 can then be separated and withdrawn from the channel 11 and between the ring 9 and the reduced portion of the pipe 1 it of course being necessary to first contract the spring 23 so as to disengage it from the sections of the guide ring.

While, in Figs. 1 and 2, the improvement has been shown in connection with a coupling stud, it is to be understood that said improvements may also be employed in connection with an elbow, as shown in Fig. 4, this elbow being indicated at 25. Moreover, the stud, instead of being constructed as shown in Fig. 1, can be made with its exposed or projecting portion of uniform diameter, as shown at 26, this stud being interiorly screw-threaded at 27 and the ring 28 being extended up to the threaded portion. This ring may have grooves 29 extending throughout the length thereof for the reception of a suitable tool whereby the ring may be unseated. These grooves are utilized in lieu of the recesses 5 shown in Figs. 1 and 4. Moreover, the ring 30 may be provided with only a single outstanding arm or terminal 31 in lieu of the two outstanding portions shown in Fig. 2.

Various changes can of course be made in the construction and arrangement of the parts without departing from the spirit of the invention, it being obvious that the pipe 1 can be of any shape desired and that, if preferred, the spring 23 may be dispensed with, as the same is unnecessary as long as the various parts are clamped and held together in the manner shown in Fig. 1.

What is claimed is:—

1. A coupling including a member having an annular enlargement at each end, there being an annular shoulder outstanding from the outer face of one of the enlargements, a nipple, a coupling ring interiorly screw threaded for engagement with the nipple, said ring having an interior annular groove and being slidable onto the reduced portion of the coupling member, a sectional guide ring insertible between said reduced portion and the coupling ring and expansible into the groove in the coupling ring, one edge of said guide ring being substantially flush with one end of the coupling ring, the internal diameter of the guide ring when expanded being substantially equal to the external diameter of the shouldered annular enlargement, and said expanded ring being movable onto the annular enlargement and against the annular shoulder, and yielding means removably mounted in the guide ring for holding it seated in the groove.

2. A coupling including a member having an annular enlargement at one end, there being an annular shoulder outstanding from the outer face of the enlargement, a nipple, a coupling ring interiorly screw threaded for engagement with the nipple, said ring having an interior annular groove and being slidable onto the enlargement, a sectional guide ring insertible between the coupling ring and the member at a point removed from the enlargement, said ring being expansible into the groove in the coupling ring and movable with said ring onto the enlargement, said enlargement constituting means for holding the expansible ring within the groove, said shoulder constituting an abutment for the guide ring.

In testimony that I claim the foregoing as my own, I have hereto affixed my signature in the presence of two witnesses.

JOHN GAPP.

Witnesses:
W. F. VAUGHAN,
M. R. SPELMAN.